(12) United States Patent
Kurz

(10) Patent No.: US 6,723,945 B2
(45) Date of Patent: Apr. 20, 2004

(54) WELDING DEVICE WITH A FIELD FORMER

(75) Inventor: Roland Kurz, Linden-Leihgestern (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/277,007

(22) Filed: Oct. 21, 2002

(65) Prior Publication Data

US 2003/0146193 A1 Aug. 7, 2003

Related U.S. Application Data

(63) Continuation of application No. 09/533,367, filed on Mar. 22, 2000, now abandoned.

(51) Int. Cl.$^7$ ................................................. B23K 9/30
(52) U.S. Cl. ............................................................ 219/98
(58) Field of Search ..................... 219/98, 99, 124.03, 219/97, 137.31

(56) References Cited

U.S. PATENT DOCUMENTS

| | | |
|---|---|---|
| 1,854,536 A | 4/1932 | Wilson |
| 2,936,363 A | 5/1960 | Noland et al. |
| 4,620,079 A | 10/1986 | Allmann et al. |
| 5,171,959 A * | 12/1992 | Schmitt et al. ................ 219/98 |
| 5,177,387 A * | 1/1993 | McMichael et al. ........ 310/90.5 |
| 5,502,291 A * | 3/1996 | Cummings .................... 219/98 |
| 5,540,116 A * | 7/1996 | Hull et al. ...................... 74/572 |
| 5,640,887 A * | 6/1997 | Hull et al. ...................... 74/572 |
| 5,757,098 A * | 5/1998 | Higuchi et al. ............. 310/90.5 |
| 5,938,945 A * | 8/1999 | Hofmann et al. .............. 219/99 |
| 5,977,506 A * | 11/1999 | von Daniken ................ 219/99 |

FOREIGN PATENT DOCUMENTS

| | | |
|---|---|---|
| DE | 4415175 | 3/1995 |
| DE | 19545607 | 1/1997 |
| DE | 19713344 | 4/1998 |
| DE | 19654336 | 5/1998 |
| FR | 1121520 | 8/1956 |

* cited by examiner

*Primary Examiner*—Tom Dunn
*Assistant Examiner*—Jonathan Johnson
(74) *Attorney, Agent, or Firm*—Edward D. Murphy

(57) ABSTRACT

A welding device includes a holder for a weld part (1) adapted to be moved substantially perpendicularly to, and away from, a surface of a workpiece (2) on which the weld part (1) is to be welded. An arc producing system produces an arc between the weld part (1) and the surface of the workpiece (2) with the arc generating a magnetic flux. A field former (3) includes a low-retentivity steel and provides a flux path for the magnetic flux generated by the arc.

12 Claims, 6 Drawing Sheets

WELDING DEVICE WITH A FIELD FORMER

This is a continuation U.S. application Ser. No. 09/533,367, filed on Mar. 22, 2000, now abandoned and titled "WELDING DEVICE WITH FIELD FORMER," which is pending. The disclosure of applicant's above-noted application is incorporated herein by reference thereto.

BACKGROUND OF THE INVENTION

The invention relates to a welding device, in particular to a welding device for arc welding by lifting and striking.

Welding devices are known for welding a weld part which comprise a holder for weld parts. The holder is movable substantially perpendicularly to the surface of a workpiece and away from it. The welding device comprises a system for producing an arc by lifting and striking between the weld part and the surface of the workpiece. To influence the arc, it is known that the welding device is equipped with a system comprising a field former for producing magnetic field acting on the arc. A welding device of this type is described, for example, in German Patent No. 44 00 957. This device is provided with an electromagnetic coil to which a flux guiding part with a truncated cone shaped field former is coupled. The extended surface line of the field former indicates the welding position. A magnetic field component extending substantially radially to the weld part is formed on the substantially annular pole face of the field former. European Patent No. 167 150 and German Patent No. 195 12 094 describe further embodiments of a welding device. Devices of the kind described in these patents, however, typically use magnetic fields generated by coils, that add complexity and expense, or permanent magnets that will deteriorate in the high temperature environment of the welding operation.

SUMMARY OF THE PRESENT INVENTION

On the basis of the foregoing, the object of the present invention is to develop the known welding device so as to improve the welded joint produced by the welding device.

The welding device according to the invention, in particular for arc welding by lifting and striking, is distinguished in that it comprises at least one field former consisting at least in part of a low-retentivity steel. The field former influences the magnetic field and therefore also the propagation of the arc. A field former consisting at least in part of a low-retentivity steel is particularly effective, in particular if workpieces made of non-magnetic materials are to be welded together.

According to a further feature of the invention there is proposed a welding device comprising at least one field former having at least one straight portion. This allows the arc to be influenced better in the case of non-circular weld parts. It is proposed, in particular, that the field former consists at least in part of a low-retentivity steel.

According to an advantageous configuration of the welding device, it is proposed that the at least one field former has a polygonal cross section, and is preferably substantially U-shaped in design. The arms of the U-shaped field former are preferably spaced from one another such that the weld part can be introduced at least in part between them. This configuration of the field former allows the magnetic field to be influenced even in the corner region, in particular in the case of weld parts with a substantially rectangular cross section.

According to a further advantageous configuration of the welding device it is proposed that two U-shaped field formers are provided which are spaced with free arms directed toward one another.

It has been found that the magnetic field and therefore also the arc can be influenced sufficiently and adequately for the quality of the welded joint if the at least one field former is rod-shaped in design. The welding device according to the invention preferably comprises two field formers extending substantially parallel to one another.

According to a further advantageous configuration of the welding device, it is proposed that the at least one field former is connected to a mouth-piece which can be brought into contact with the surface of the workpiece.

BRIEF DESCRIPTION OF THE ACCOMPANYING DRAWINGS

Further details and advantages of the welding devices according to the invention will be described with reference to the embodiments illustrated in the drawings, in which.

DETAILED DESCRIPTION OF THE PRESENT INVENTION

The field former of the present invention is intended for use in stud welding devices of various known types. It is particularly suitable for use in recent designs such as those set forth in U.S. Pat. No. 5,502,291 and U.S. patent application, Ser. No. 08/817,475, filed Oct. 18, 1995. However, the invention may also be used in older welding devices such as that set forth in U.S Pat. No. 4,620,079. The invention may also be used in conjunction with suitable methods of controlling the welding process, such as those set forth in U.S. Pat. Nos. 5,171,959; 5,977,506 and 5,938,945. The entire disclosures of all of these U.S. patents, and of the U.S. patent application mentioned above, are hereby incorporated herein by reference.

Figure 1:
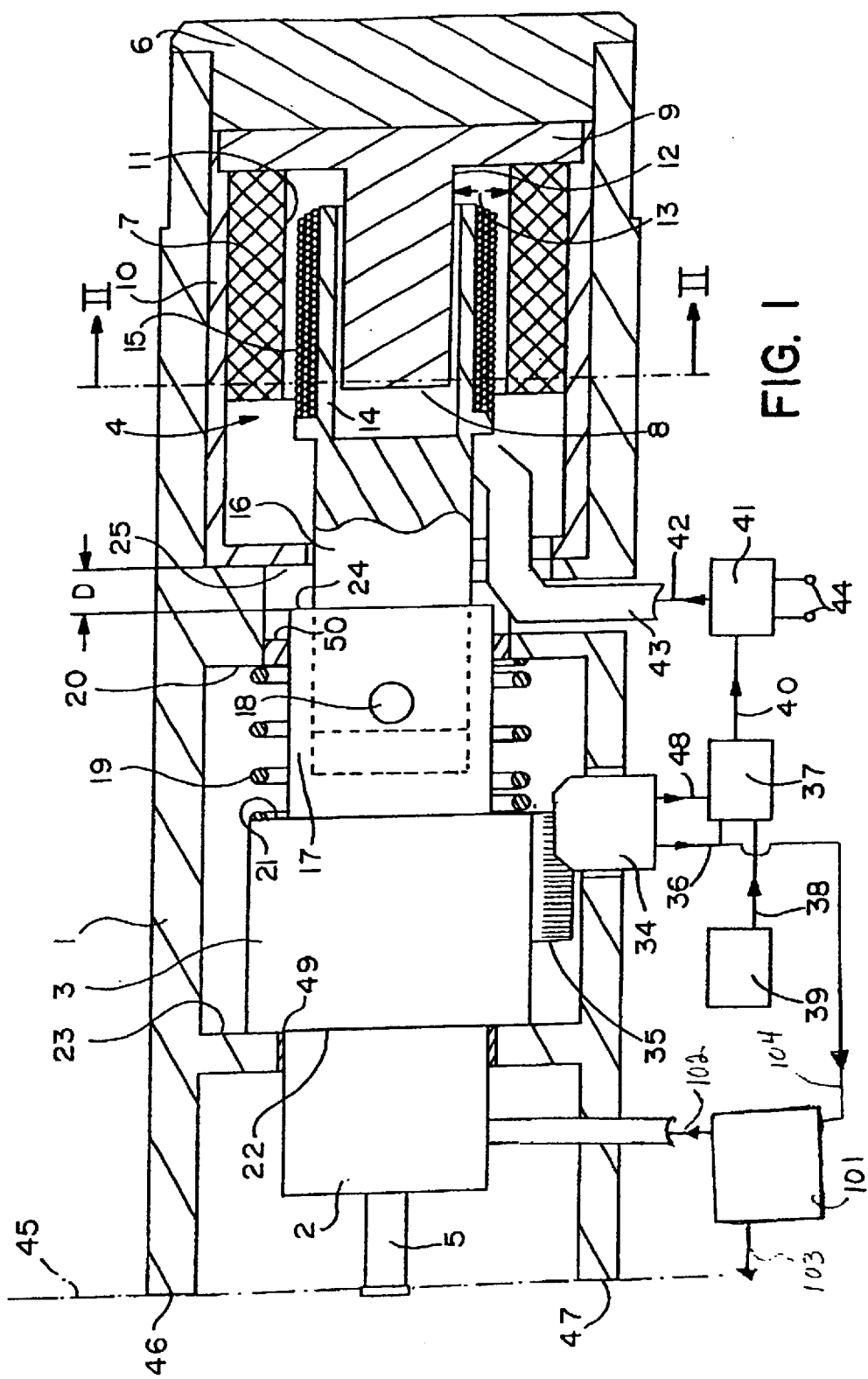
FIG. 1 shows the stud welding gun equipped with a permanent magnet with the stud holder in its forward position.

FIG. 1 shows a stud welding device with a casing 1, a stud holder 2, an axially movable adjusting element 3 and a magnet system 4 A weld stud 5 which is to be welded to a workpiece (not shown) is fixed in the stud holder 2. The casing 1 encloses the stud holder 2, the adjusting element 3 and the magnet system 4 and is closed at its end remote from the stud holder 2 by the rear wall 6.

The magnet system 4 responsible for the movement of the stud holder 2 consists of the permanent magnet 7, the core 8 and the yoke 9 which adjoins the core 8 and closes the magnetic flux originating from the permanent magnet 7. The material of the permanent magnet is samarium cobalt or neodymium boron iron which provides a relatively large magnetic field in response to a given magnetizing force in comparison to conventional materials. At its exterior, the permanent magnet 7 is surrounded by the casing 10 which consists of magnetically conductive material and supplies the flux conveyed via the yoke 9 to the rear of the permanent magnet 7. Between the internal face 11 of the permanent magnet 7 and the external face 12 of the core 8 there exists the air gap 13 in which the sleeve 14 with the coil 15 wound thereon is axially movably arranged. The magnetic field bridging the air gap 13 therefore passes through the coil 15 so the coil 15 is exposed to an axial force as current flows through the coil 15. This axial force is dependent on the one hand on the intensity of the magnetic field and on the other hand on the intensity of the current flowing through the coil 15, resulting in a corresponding axial displacement of the coil 15 and therefore of the sleeve 14 during the flow of current while allowing for the inertia of the components connected to the coil 15. The sleeve consists of magnetically non-conductive material, for example of a rigid plastics material, so it cannot influence the magnetic field passing through the coil 15.

The extension 16 adjoins the sleeve 14 in the direction of the weld stud 5 and continues into the length of tube 17 forming part of the adjusting element 3. The extension 16 is connected to the length of tube 17 by means of the pin 18 penetrating these two components. A non-positive connection of sleeve 14 is produced in this way via the extension 16 to the length of tube 17 and therefore the adjusting element 3 on which the stud holder 2 is fastened. Owing to a rigid connection between the coil 15 and the sleeve 14, axial forces originating from the coil 15 owing to the magnetic field act directly on the sleeve 14 so an axial movement of the coil 15 is transmitted in its entirety to the weld stud 5.

The movable adjusting element 3 is supported by bushings as shown at 49, 50. Bushings 49, 50 are preferably made of Frelon, a composite bearing material including a polytetrafluoroethylene compound which is available from the Pacific Bearing Seal Co. of Rockford, Ill., which has been found to withstand the large number of abrasive particulates and ions that are present in a welding environment and cause most known materials to fail in a very short time. Frelon provides an unexpectedly low friction with element 3 and to have any unexpectedly long life even in the extremely adverse environment of a welding gun.

The length of tube 17 carries the helical spring 19 resting on the one hand on an internal projection 20 of the casing 1 and on the other hand on a shoulder 21 of the adjusting element 3. The helical spring 19 presses the adjusting element 3 with its front face 22 against the internal shoulder 23 of the casing 1, the internal shoulder 23 forming a stop on attainment of which the adjusting element 3 adopts its front end position.

Against the tension of the helical spring 19, the adjusting element 3 and therefore all other components connected to it can be displaced axially into a rear end position which is defined by the end face 24 running against the front wall 25 of the casing 10. In order to bring the length of tube 17 and therefore the weld stud 5 and the coil 15 into this rear end position, a correspondingly high current has to be applied to the coil 15 to produce an axial force which overcomes the opposing force of the helical spring 19. The range of adjustment of the adjusting element 3/17 corresponds to the distance D.

Figure 2:
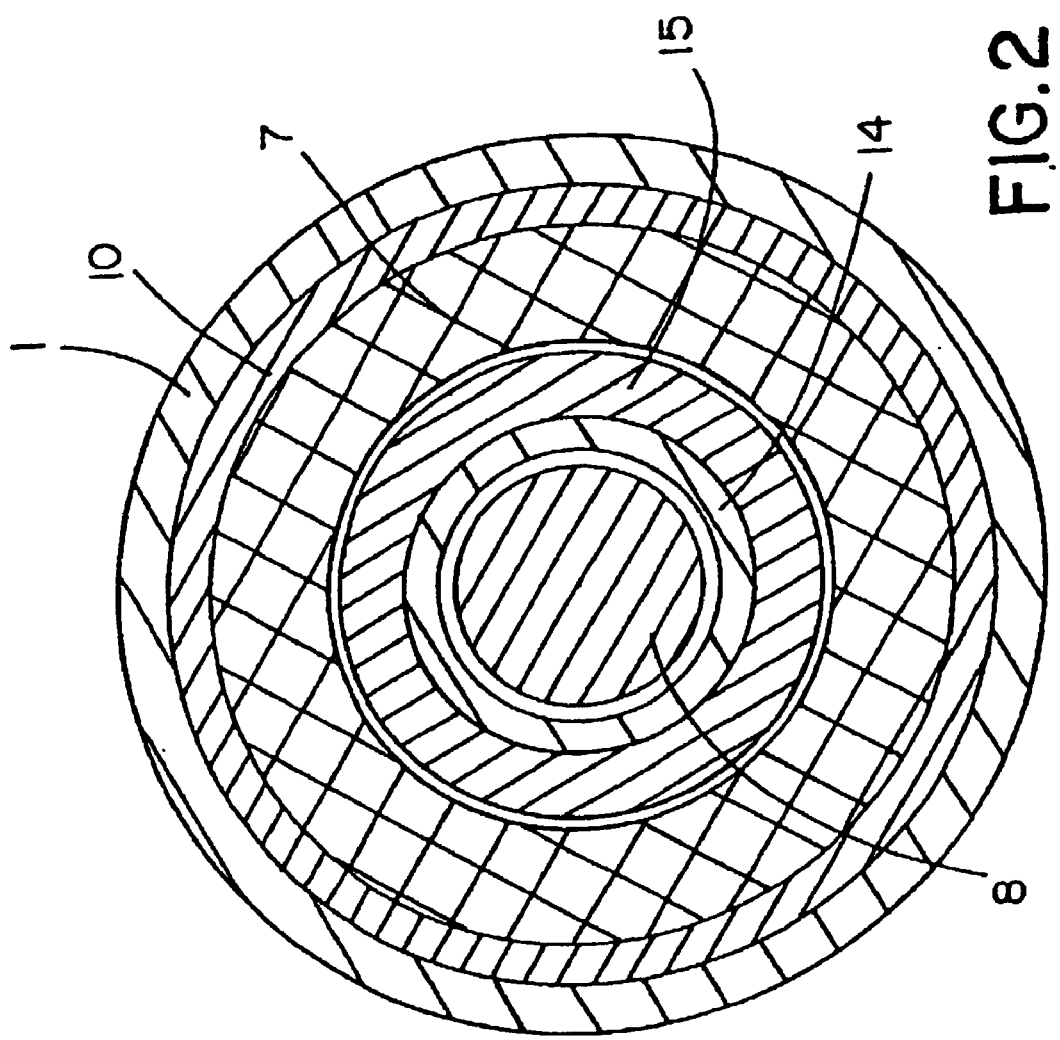
FIG. 2 is a section through the arrangement according to FIG. 1 along line II—II.

The above-described components of the stud welding device are essentially rotationally symmetric bodies, as shown in FIG. 2 which is a section along line II—II in FIG. 1.

Suitable circuits for use in the welding device of this invention for producing and controlling the pilot arc and welding arc are set forth in the aforementioned U.S. Pat. Nos. 5,171,959 and 5,977,506. Preferably, the welding circuit of U.S. Pat. No. 5,977,506 is used, as illustrated schematically in FIG. 1, wherein an arc power supply/control device 101 containing the circuit is electrically connected via line 102 to the stud holder 2 and via line 103 to the workpiece. The displacement signal on line 36 is also supplied to the control device 101 via line 104 so that the arc current is properly coordinated with the stud movement.

Figure 3:
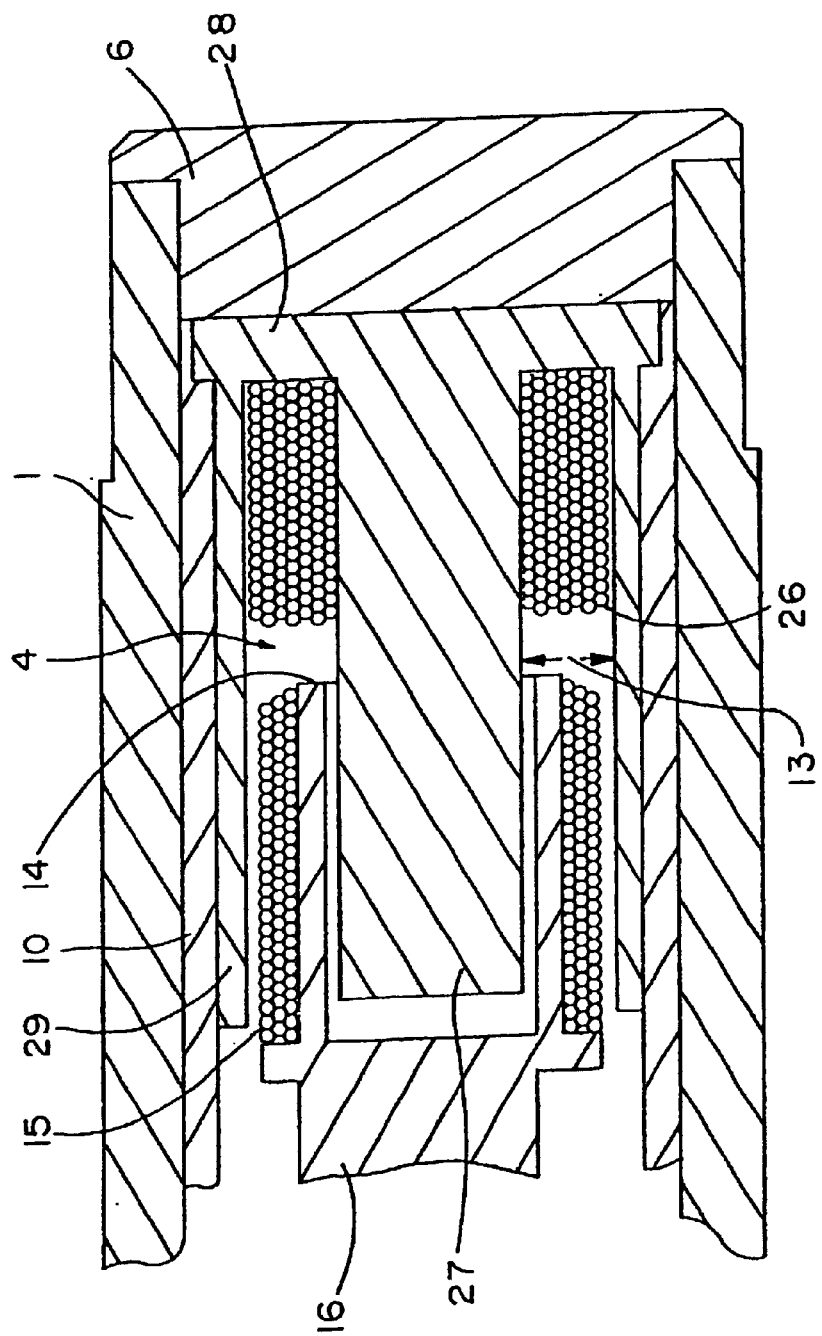
FIG. 3 shows the magnetic part of the stud welding gun according to FIG. 1 but with an electromagnet, the adjusting element being shown in a rear position.

FIG. 3 essentially shows the magnetic part of the stud welding device according to FIG. 1, but an electromagnet 26 which consists of a winding and applies the magnetic field required for the necessary axial movement is provided in the magnet system 4. The winding of the electromagnet 26 is wound onto the core 27 so the magnetic field originating from the electromagnet 26 spreads via the core 27 to the yoke 28 from where it is conveyed via the casing 10 and the bush 29 inserted therein to the coil 15. As in the embodiment according to FIG. 1, the coil 15 is wound onto the sleeve 14 which continues to the left into the extension 16. Casing 10 and bush 29 consists of magnetizable material. As in the embodiment according to FIG. 1, the entire arrangement is enclosed by the casing 1. The components which are connected on the left are the same as in the embodiment according to FIG. 1, so reference can be made to the description of FIG. 1 in this respect.

FIG. 3 shows the sleeve 14 in its rear end position. In this end position, the coil 15 is kept under the influence of the magnetic field of the electromagnet 26 of which the magnetic field bridges the air gap 13 between the external surface of the core 27 and the internal surface of the bush 29. A magnetic flux which passes radially through this air gap and to which the coil 15 arranged axially movably in the air gap 13 is fully exposed is therefore produced as in the embodiment according to FIG. 1.

Movements at accurately maintained speeds along the path covered can be achieved within a period of up to 1 second required for the entire welding process using the stud welding devices shown in FIGS. 1 and 3. During these movements it is important to utilize a pilot current which is switched on when the weld stud makes contact with the workpiece to ignite a pilot arc which burns after the pilot current has been switched on owing to removal of the weld stud from the workpiece, then to produce a melt on the workpiece by means of the welding arc which is also switched on while holding the weld stud in a rear end position, whereupon the weld stud is moved beyond the previously adopted starting position in the direction of the workpiece, the weld stud sinking with its end face into the melt which then solidifies. Owing to the melt, the weld stud adopts a position which is advanced slightly further than the starting position and into which it is moved at a relatively low speed so that the spraying of liquid metal owing to an abrupt entrance of the weld stud into the melt is prevented. Depending on the welding parameters (strength of the workpiece, thickness of the weld stud, workpiece material and the like) there are various patterns of motion for this sequence of movements which have to be observed in order to achieve optimum welds.

Figure 4:
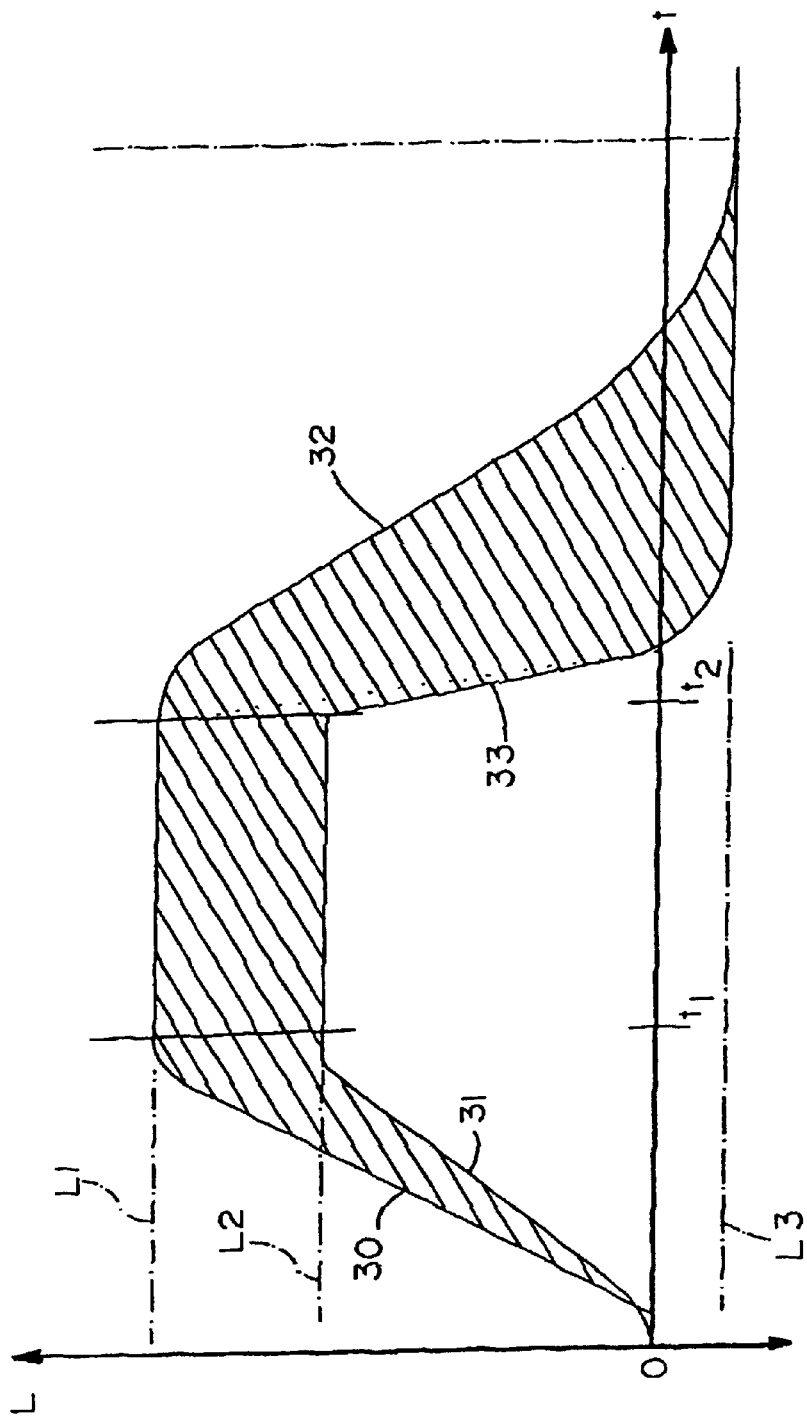
FIG. 4 is a displacement-time graph which is plotted as a range of movement and in which the movement of a weld stud has to take place while allowing for a given workpiece.

A range of movement comprising such a pattern of motion is plotted as a graph in FIG. 4. The respective position L of the weld stud with respect to a starting position O is plotted on the abscissa of the graph. The ordinate represents a time axis for the lapsed time t. In the graph, the individual points therefore represent the position L of the weld stud at a specific moment tx. The hatched field represents the limit values for patterns of motion extending within this field. It starts from the starting position O and passes via the lines 30 and 31, reaching the end positions L1 and L2 in which the weld stud remains in its position between moments t1 and t2. The oblique position of the lines 30 and 31 represents the speed of the weld stud in its movement. After moment t2, the weld stud is moved along lines 32 and 33 back in the direction of the workpiece where, after passing beyond the line 0 defining the starting position, sinks into the melt at a decreasing speed. The weld stud passes through the region from the line 0 to the line L3, on attainment of which the weld stud has reached its end position after passing through the return movement. As shown, the lines 32 and 33 extend in the region between level 0 and L3 with a constantly decreasing inclination, representing the decreasing speed.

Optimum welding of the respective weld stud is produced if the pattern of motion which is observed exactly during this movement lies in the hatched region according to FIG. 4.

The automatic resetting arrangement shown in FIG. 1 is provided in order to control the stud welding device in the sense of a pattern of motion described in conjunction with FIG. 4. This resetting arrangement is based on the absolute measurement of the respective position of the adjusting element 3 and therefore of the weld stud 5 by means of the linear displacement measuring device 34 which scans a scale 35 arranged on the adjusting element 3 and produces a corresponding displacement signal depending on the determined position of the adjusting element 3. This displacement signal is supplied via the line 36 to the comparator 37 which also receives stepwise, via the line 38 from the memory 39, position signals which represent a desired signal for the weld stud 5 in the sense of a pattern of motion contained in the memory 39. This desired signal, as an actual signal, is compared with the displacement signals transmitted via the line 36 and the result of comparison is conveyed via the line 40 to the controller 41 which adjusts the current strength of the current supplied to the coil 15 via the line 42. The line 42 is continued in the channel 43 shown as a pipe and is attached to the ends of the coil 15. The controller 41 receives, at its terminals 44, a voltage which is then adjusted on the basis of the comparison signal supplied via the line 40.

In detail, the following operations take place: one or more displacement-time graphs are stored in the memory 39 as laws of motion which can be called up selectively so the individual positions of the weld stud 5 at associated moments can be fed to the comparator 37 stepwise via the line 38. The comparator 37 compares these individual desired signals which are offered stepwise with the actual signals which are supplied via the line 36 and indicate the actual position of the weld stud 5. In the event of a deviation in the signals supplied to the comparator 37, the comparator 37 delivers a control voltage which is transmitted via the line 40 and of which the value and sign are controlled in a known manner by the controller 41 in such a way that the coil is supplied with either a stronger or a weaker current to be able to come as close as possible to the desired position of the weld stud 5. This process takes place stepwise according to the shape of the pattern of motion from the memory 39, the coil 15, and therefore the mechanism connected to it in its entirety, being forcibly moved. In particular, it is possible to adjust the respective speed of the coil 15 in the manner required for the respective phase in the course of the welding process. In particular, the return movement from the rear end position in the direction of the workpiece can therefore be delayed during the immersion of the weld stud 5 into the melt, for which purpose the coil 15 may have to receive a current running in the reverse direction from before in order to decelerate the movement of the coil 15.

With this arrangement it is advantageously possible automatically to give the weld stud 5 a reference position during application of the stud welding device to a flat workpiece. This is effected by pressing the stud welding device according to FIG. 1 against a flat workpiece, the weld stud 5 projecting beyond the dot-dash connecting line 45 being pressed back against the pressure of the helical spring 19. The dot dash line 45 represents a plane connecting the end faces 46 and 47 of the casing 1. When the end faces 46 and 47 are applied to a flat workpiece, a defined position is produced with respect to the weld stud 5, this defined position giving the weld stud its reference position, as stated. This reference position is read from the scale 35 by means of the displacement measuring device 34 and is transmitted to the comparator 37 as a reference signal via the line 48. The comparator 37 therefore begins to operate on the basis of the reference signal as actual signal in comparison with the desired signal which is read from the memory 39 and must remain equal at the beginning of the welding process while the weld stud 5 remains in the adopted position. The pattern of motion is then covered in the above described manner, the actual signal supplied to the comparator 37 via the line 36 being included stepwise.

It is not necessary for the workpiece to have a plane configuration. Even if the workpiece has curves in the region of the welding process, it is still possible to displace the weld stud 5 into its respective reference position in which the weld stud contacts the workpiece. This is its reference position from which the welding process takes place in the conventional manner.

Utilizing a moving coil rather than a movable permanent magnet and selecting the magnet material to be a rare earth material such as samarium cobalt or neodymium boron iron, one can achieve speeds of up to 800 millimeters/second and coil strokes of over 5 mm. Coil strokes of up to 10 mm have been achieved. Such long strokes allow the position of the actuator to be adjusted to compensate for the variation in distance to the workpiece from the end of a stud. Faster response and more accurate position control of the coil are achieved by using a moving coil which has a much lower mass then the permanent magnet. Moreover, the tendency of moving permanent magnets to pull towards one side due to its attraction to nearby metal, known as off-axis side loading, results in excessive wear on the bearings and premature failure. Such an effect is avoided by using a moving coil.

Another advantage of the moving coil is the avoidance of the hysteresis present in moving permanent magnet actuators. Since the permanent magnet is surrounded by steel parts the amount of current required to move the permanent magnet at a given position will depend upon whether it is moving from the left or the right. No such effect can occur with a moving coil. Thus, the moving coil system allows for simpler and more accurate position control than does a moving permanent magnet and fixed coil system.

Figure 5:
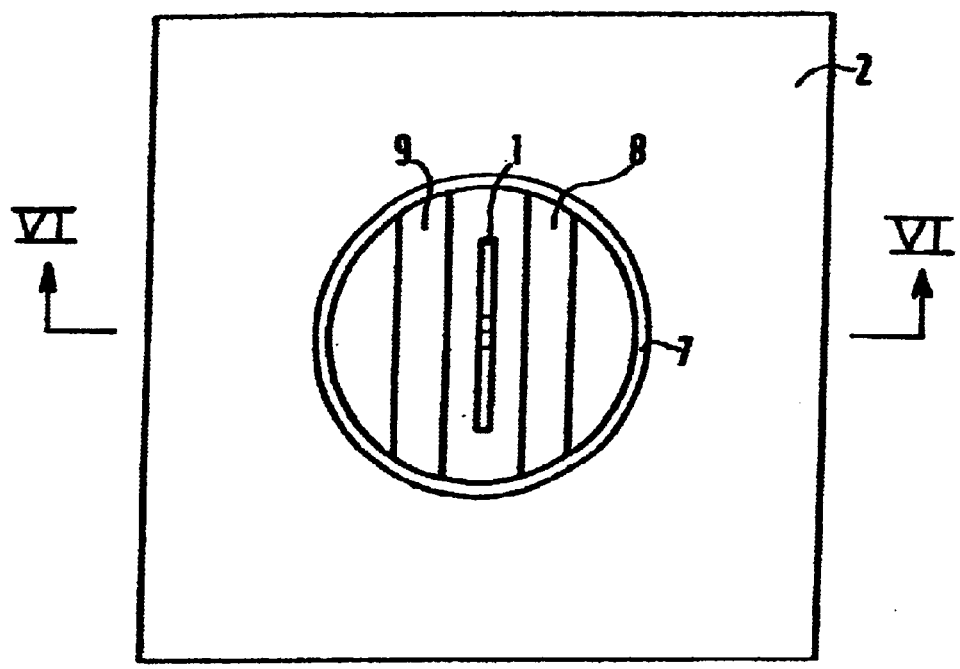
FIG. 5 shows a first embodiment of a field former of the welding device in a plan view.

FIG. 5 shows a part of a welding device. The welding device comprises a holder corresponding to the holder 2 of FIG. 1, for a weld part 1 adapted to be moved substantially perpendicularly to a surface of a workpiece 2 and away from it. The welding device comprises a system such as that described in connection with FIGS. 1 through 4 for producing an arc between the weld part 1 and the surface of the workpiece 2. The welding device also comprises a system with a field former 3 for providing a flux path for the magnetic flux generated by the arc. The field former 3 preferably consists at least in part of a low-retentivity steel. The field former in FIG. 5 is formed by two U-shaped field formers 3. Each field former 3 comprises arms 4,5 extending substantially parallel to one another. The arms 4,5 are connected to one another by a common base 6. The two U-shaped field formers 3 are spaced from one another. The end faces of the free arms 4,5 are directed toward one another. The weld part 1 is arranged between the arms 4,5.

Figure 6:
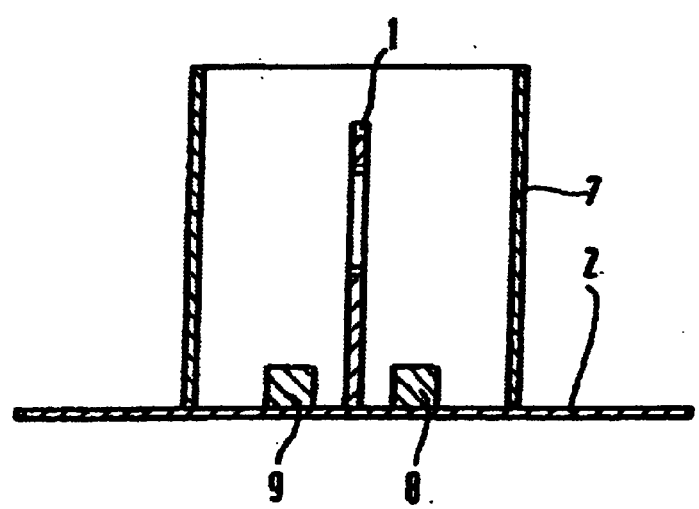
FIG. 6 shows the field former according to FIG. 5 in section along the line VI—VI.

As shown, in particular, in FIG. 5, the field formers 3 are connected to a nose-piece 7. The nose-piece 7 can be brought into contact with the surface of the workpiece 2, as shown in FIG. 6. The nose-piece 7 may comprise the forward end of the casing 1 shown in FIG. 1.

Figure 7:
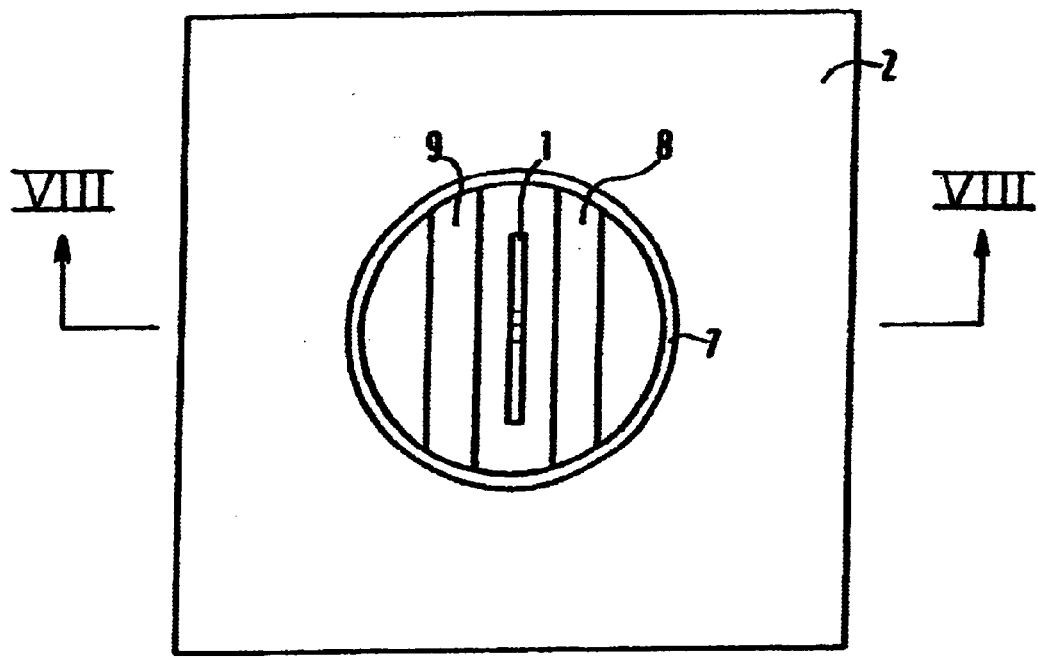
FIG. 7 shows a second embodiment of a field former of a welding device in a plan view.
Figure 8:
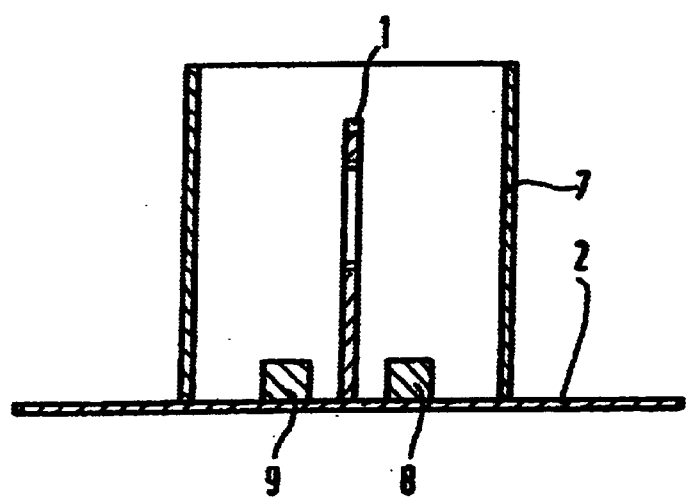
FIG. 8 shows the field former according to FIG. 7 in section along the line VIII—VIII.

FIGS. 7 and 8 show a further embodiment of a welding device. This comprises two field formers 8, 9 which are substantially rod-shaped in design. The two field formers 8, 9 extend substantially parallel to one another. They are spaced from one another so that a weld part 1 can be placed between the field formers 8, 9. The field formers 8, 9 are connected to the nose-piece 7. The field formers 8, 9 are also preferably field formers which consist at least in part of a low-retentivity steel.

As noted, the field formers 3 and 8, 9 of this invention are formed of low-retentivity (high permeability) steel. By way of example, such materials may exhibit a level of permeability on the order of 1,000 ( or more. Such materials are highly conductive of magnetic flux. Therefore, the former elements interact with the welding arc, and with the flux generated by the arc. The result of this interaction is that the arc, which would otherwise concentrate toward the center of the weld part 1, will instead be extended more evenly along the entire length of the weld part, resulting in a satisfactory weld joint, even at the ends of the weld part.

In practice, it is preferred that the embodiment of FIGS. 5 and 6 be used when the weld part and the workpiece are composed of more highly magnetic steel, such as martensitic or ferritic steel, while the embodiment of FIGS. 7 and 8 is preferred when the weld part and the workpiece are composed of non-magnetic, or less magnetic, steel such as austenitic steel.

What is claimed is:

1. A welding device with a holder for a weld part (1) adapted to be moved substantially perpendicularly to a surface of a workpiece (2) and away from it, on which the weld part (1) is to be welded, an arc producing system for producing an arc between the weld part (1) and the surface of the workpiece (2) with the arc generating a magnetic flux, a field former (3,8,9), characterized in that the field former (3,8,9) includes a low-retentivity steel and provides a flux path for the magnetic flux generated by the arc.

2. A welding device with a holder for a weld part (1) adapted to be moved substantially perpendicularly to and away from a surface of a workpiece (2) on which the weld part (1) is to be welded, an arc producing system for producing an arc between the weld part (1) and the surface of the workpiece (2) with the arc generating a magnetic flux, a field former (3,8,9) characterized in that the field former (3,8,9) includes at least one straight portion and provides a flux path for the magnetic flux generated by the arc.

3. The welding device according to claim 1, characterized in that the field former (3) essentially has a polygonal cross section, and is U-shaped in design.

4. The welding device according to claim 3, characterized in that two U-shaped field formers (3) are provided which are spaced with free arms (4,5) directed toward one another.

5. The welding according to claim 1, characterized in that the field former (0,9) is rod-shaped in design.

6. The welding device according to claim 5, characterized in that two field formers (8,9) are provided which extend substantially parallel to one another.

7. The welding device according to claim 1, characterized in that the field former (3,8,9) is connected to a nose-piece (7).

8. The welding device according to claim 2, characterized in that the field former (3) essentially has a polygonal cross section, and is U-shaped in design.

9. The welding device according to claim 8, characterized in that two U-shaped field formers (3) are provided which are spaced with free arms (4,5) directed toward one another.

10. The welding according to claim 2 characterized in that the field former (8,9) is rod-shaped in design.

11. The welding device according to claim 10, characterized in that two field formers (8,9) are provided which extend substantially parallel to one another.

12. The welding device according to claim 2, characterized in that the field former (3,8,9) is connected to a nose-piece (7).

* * * * *